Sept. 11, 1962  E. JORDAN  3,053,418
SEED-SOWING MACHINE
Filed Dec. 20, 1957  2 Sheets-Sheet 1

INVENTOR
Ernst Jordan

BY Richardy Geier
ATTORNEYS

Sept. 11, 1962          E. JORDAN                  3,053,418
                    SEED-SOWING MACHINE
Filed Dec. 20, 1957                          2 Sheets-Sheet 2

INVENTOR
Ernst Jordan

BY Richards & Geier

ATTORNEYS 3,053,418
SEED-SOWING MACHINE
Ernst Jordan, Leinpfad 17, Hamburg, Germany
Filed Dec. 20, 1957, Ser. No. 704,120
3 Claims. (Cl. 222—177)

This invention relates to an agricultural machine, and refers more particularly to a seed-sowing or seed-planting machine.

Seed-sowing or seed-planting machines as known in prior art include containers which deposit the seeds in the furrows or grooves into the earth. Such devices are suitable in part for seeds of large size but are not suitable for smaller seeds. Practical experience has shown that seeds often form bridges or blocks which prevent the proper flow of seeds from a hopper to a seed receiving and distributing device.

An object of the present invention is to improve prior art machines of this type and to provide a seed-sowing or seed-planting machine which can be used most effectively for the sowing and planting of seeds of a large variety of sizes.

Other objects of the present invention will become apparent in the course of the following specification.

In accomplishing the objects of the present invention, it was found advisable to provide a seed-sowing machine having a hollow shaft provided with openings for the seeds, and cooperating with one or more cylindrical or tubular bodies of smaller diameter than the shaft and loosely mounted within the shaft in such manner that this body or these bodies serve as a carrier or a support for seeds located in the openings of the shaft.

These cylindrical bodies may be provided with circumferential projections, extending into the seed-containing openings of the shaft, and the arrangement may be such that these projections will penetrate deeper and deeper into these openings during the rotation of the shaft as the openings approach the position in which the seeds are ejected therefrom.

When the seed-ejecting shaft is rotated, the weight of the body or bodies located therein will cause them to lie upon the inner wall of the hollow shaft upon the bottom of the shaft. Due to the weight of this body, it will form the bottom of the seed-ejecting openings of the shaft and it will press any seeds which may be clamped or stuck within the openings out of these openings. On the other hand, the body, due to its smaller size, will not engage the seed-ejecting openings located upon the upper portion of the shaft. It will merely prevent the sliding of the seeds through these openings into the interior of the shaft.

An important advantage of the construction of the present invention is that it provides an uninterrupted and easy flow of seeds which may be of different and non-uniform sizes out of the seed-ejecting openings, serving solely as guiding containers for the seeds. However, the construction of the present invention has the additional advantage that instead of using several groups of individually spaced openings for receiving seed of a predetermined type, it is possible to provide pockets of a predetermined size which will receive a desired number of seeds which are to be combined into a single group. By way of example, it is possible to provide large oval pockets in the seed-ejecting shaft for the planting of beans, the pockets being of such dimensions that each of them can receive three beans or any other desired number of beans.

In accordance with a further embodiment of the present invention, the above described hollow seed-ejecting shafts with the hoppers located above these shafts can be combined into an aggregate, consisting of a plurality of such shafts which are coupled with each other and which are preferably adjustable relatively to each other. A pull-plate and a pressing roller located behind the plate are attached behind the above-mentioned hoppers and are used for smoothing the seed-containing holes and for pressing down the earth.

The invention will appear more clearly from the following detailed description when taken in connection with the accompanying drawings, showing by way of example preferred embodiments of the inventive idea.

Figure 1:
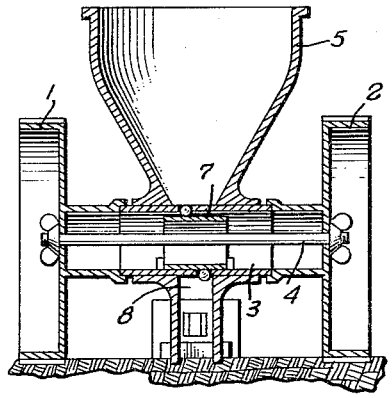
FIGURE 1 is a transverse section through a seed-sowing machine constructed in accordance with the principles of the present invention.
Figure 2:
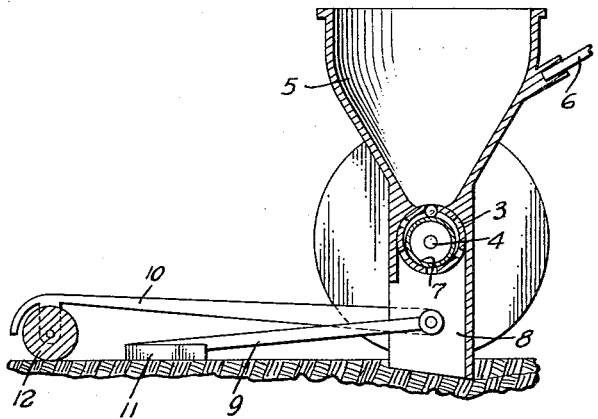
FIGURE 2 is a longitudinal section through the same machine.
Figure 3:
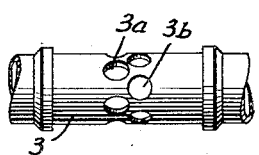
FIGURE 3 illustrates in side view a portion of the seed-ejecting shaft.

The seed-sowing machine shown in FIGURES 1, 2 and 3 of the drawings comprises two wheels 1 and 2, which support the machine upon the ground and which are connected with each other over a hollow seed-ejecting shaft 3. The frame of the machine includes a seed-receiving container 5, the lower end of which is in communication with the seed-ejecting shaft 3. The machine is propelled by a suitable pull-rod 6 shown in FIGURE 2.

In accordance with this embodiment, the wheels 1 and 2 are firmly connected with the shaft 3 by means of a rod 4 which extends through the shaft 3 and which is firmly connected by wing nuts, or in any other suitable manner, with the hubs of the wheels 1 and 2. Due to this arrangement, the seed-ejecting hollow shaft 3 will rotate along with the wheels 1 and 2 when the machine is moved by means of the rod 6.

As shown in FIGURE 3, the seed-ejecting shaft 3 has rows of openings 3a and 3b, which extend perpendicularly to the longitudinal axis of the shaft 3. The openings 3a of one row are staggered in relation to the openings 3b of another row, and are located so closely to each other that the portions of the shaft 3 located between these openings are of zigzag form. Due to this arrangement, when the shaft 3 is rotated, the seeds located above the shaft will be moved from left to right, then from right to left, and so on, in the form of an oscillatory-like movement, so that there will be a continuous flow of the seeds from the container 5 in which they are located, to the shaft 3. The danger that the seeds may become clogged within the container 5, or that their flow will be in any way impeded, is thus effectively avoided.

The openings 3a and 3b communicate with the interior of the hollow shaft 3. As illustrated diagrammatically in FIGURES 1 and 2, the seeds located within these openings will be held therein by means of a hollow cylindrical body 7. The cylindrical member or body 7 is of smaller diameter than the shaft 3, and it is loosely placed within the shaft 3, so that it will lie on the bottom thereof. As shown in FIGURE 1, flanges may be used to prevent a sidewise movement of the cylinder 7.

The frame of the machine which includes the hopper for the container 5, also includes a seed-ejecting passage 8 located upon the bottom thereof. Also, the passage 8 may contain pivots for rods 9 and 10, extending rearwardly of the machine. A pull-plate 11 is attached to the rod 9 and is used to smooth the earth containing the seeds.

A pressing roller 12 is connected to the free end of the rod 10 and is used to press down the earth.

The operation of the described machine is as follows:

The seeds placed in the hopper 5 will drop into the openings 3a and 3b of the shaft 3 and will be held therein by the cylinder 7. A seed is held in one of the openings due to the fact that the distance between the inner edge of the opening and the underlying surface of the cylinder 7 is smaller than the diameter of the seed. Furthermore, the diameter of the seed is slightly larger than the thickness of the shaft 3. As the machine is pulled upon the ground, the shaft 3 will be rotated along with the wheels 1 and 2, and as soon as one of the openings 3a and 3b will move to the lowermost position opposite the passage 8, the seeds located in that opening will be ejected, and the cylinder 7 will push out any seeds which may have a tendency to remain within the opening.

It is apparent that the diameter of the cylinder 7 must be properly dimensioned, so that it is smaller to a predetermined extent than the inner diameter of the hollow shaft 3. It is also apparent that the openings 3a and 3b of the shaft 3 serve as containers or cages carrying the seeds which are supported by the outer surface of the cylinder 7. In the course of the rotation of the shaft 3, due to the continuously diminishing distance between the inner walls of the shaft 3 and the outer surfaces of the cylinder 7, the seeds will be safely and securely moved toward the ejecting position.

Figure 3A:
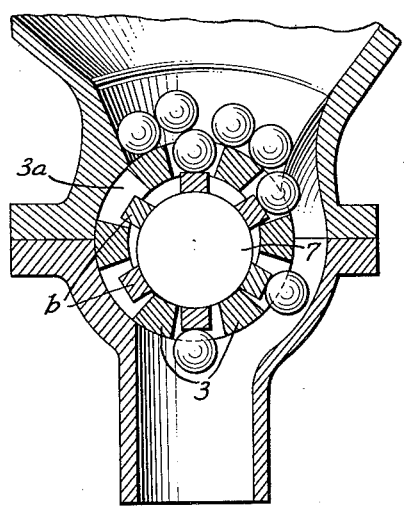
FIGURE 3a illustrates in section a portion of a somewhat differently constructed machine.

The ejection of the seeds, particularly those of larger size, can be facilitated through the provision of nipples b or similar projections upon the outer surfaces of the cylinder 7 as can be seen in FIG. 3a. Such projections will gradually penetrate more and more in the openings 3a and 3b as the shaft 3 is rotated, so as to eject the seeds completely in the ejection position of the shaft 3.

A substantial advantage of this arrangement is that the same agricultural machine may be used for seeds of all different types. If the machine is constructed with wheels of large size and a correspondingly large diameter of the shaft 3, it is possible to provide upon the shaft 3 several groups of seed-ejecting openings 3a and 3b, so that the ejected seed will be arranged upon the earth in groups of seeds and in rows which have a predetermined desired distance from each other, depending upon the size of the wheels.

Figure 4:
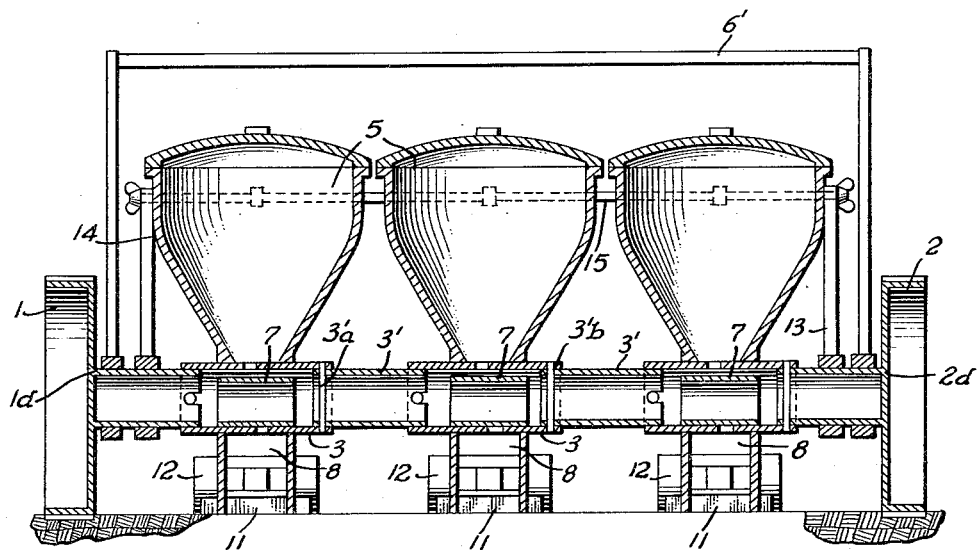
FIGURE 4 is a transverse section through a different embodiment of the present invention, wherein a plurality of seed-containing hoppers and seed-ejecting shafts are combined into a single aggregate.
Figure 5:
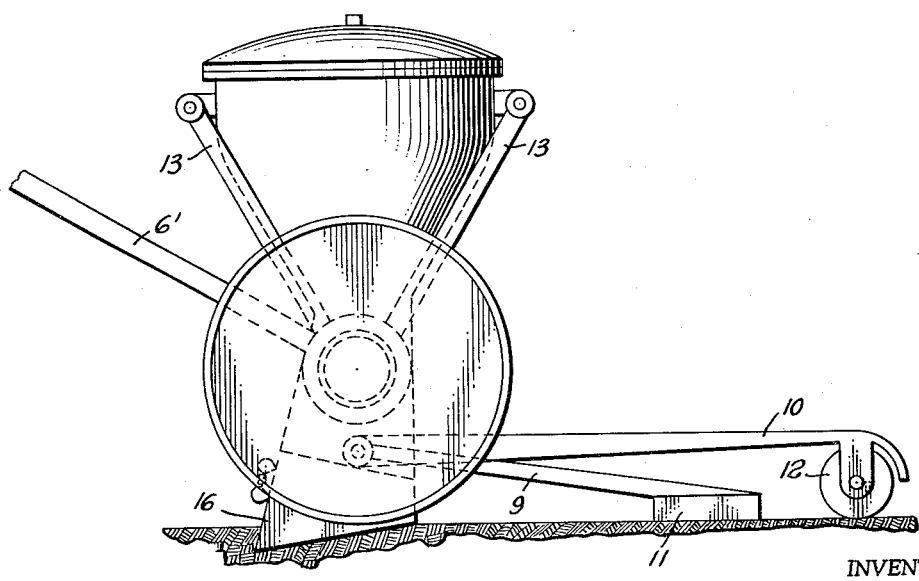
FIGURE 5 is a side view of the construction shown in FIGURE 4.

The machine shown in FIGURES 4 and 5 includes several hoppers or seed containers 5, which are located in one row and each of which cooperates with a separate seed-ejecting shaft 3. The shafts 3 are coupled with each other by means of distancing tubes 3' which extend into the adjacent ends of the shafts 3, and are connected therewith through transverse pins 3'a extending into slots 3'b provided in the distancing tubes 3', and firmly connected with the shafts 3. This provides a telescoping connection between the tubes 3' and the shafts 3.

The outer tubes of the aggregate are firmly connected with the supporting wheels 1 and 2 by means of flanges 1d and 2d. These outer tubes carry ends of rods 13 and 14, which are mounted thereon and which are connected to the hoppers or containers 5 by means of rods 15. Each of the rods 15 interconnects two rods 13 and 14. As shown in FIG. 5, two rods 13 may be mounted upon the same sleeve and may extend to the opposite sides of the hoppers 5.

The apparatus is moved by means of a frame 6' having two ends which are mounted upon sleeves located close to the wheels 1 and 2.

It is apparent that the connection of the shafts 3 and of the hoppers 5 may be carried out by other means without exceeding the scope of the present invention. In any event, it is advisable to provide behind each hopper 5 a pull-plate 11 and a pressing-roller 12. Furthermore, it is advisable to provide a furrowing implement 16, shown in FIGURE 5, and used to limit the seed-ejecting passages 8.

It is apparent that any one of the seed-ejecting shafts 3, as well as the distancing tubes 3', can be most conveniently removed and replaced by others.

It is apparent that the machines shown in the drawings are not limited to the sowing of one type of seed. In such cases wherein plants require a lengthy time period for their development, it is often desirable to provide a different type of plants in the spaces between the slowly growing plants. Preferably, such intermediate plants are of the type that grow quickly, prevent the appearance of weeds, and increase the output. In such cases, the hoppers which are arranged next to each other (FIG. 4), may be filled with seed of different types, and shafts which eject the seeds are provided in such manner that seeds of one type are ejected upon their proper locations, and seeds of the other intermediate type are placed between the seeds of the first type as may be required.

The present invention also takes into consideration the fact that proper seed sowing is possible only by the proper combination of all the necessary operations and implements, such as rollers for pressing rows of seed into the earth, furrow cutters which are adjustable in depth, seed boxes and other containers with seed-ejecting passages, devices for pressing, or rollers for pushing the seed into the ground, implements for throwing and heaping the furrows, etc. In prior art, a combination of such various implements was not attained.

It is apparent that the arrangement of the various parts of the machine can be varied, depending upon the seeds to be sown or the specific requirements of the earth. Such and other variations and modifications are possible within the scope of the appended claims.

What is claimed is:

1. Seed-sowing machine, comprising a seed-receiving container, two wheels located on opposite sides of said container and supporting said container, a seed-ejecting hollow shaft communicating with said container and having formed therein rows of seed-ejecting openings, said rows extending perpendicularly to the longitudinal axis of said shaft, the openings in one row being staggered in relation to openings in another row, whereby portions of said shaft located between the openings are of zigzag form, a cylindrical member of smaller diameter than said shaft and located within said shaft opposite said openings, said cylindrical member lying upon the lowermost portion of said shaft and being spaced from the uppermost portion of said shaft to serve as a carrier for the seeds within said openings, said wheels having flanges engaging said shaft, and a distancing rod extending through said hollow shaft and said cylindrical member and firmly connected with said wheels.

2. Seed-sowing machine, having a plurality of sowing units, each of said units comprising a seed-receiving container, a seed-ejecting hollow shaft communicating with said container and having formed therein rows of seed-ejecting openings, said rows extending perpendicularly to the longitudinal axis of said shaft, the openings in one row being staggered in relation to openings in another row, whereby portions of said shaft located between the openings are of zigzag form, and a cylindrical member of smaller diameter than said shaft and located within said shaft opposite said openings, said cylindrical member lying upon the lowermost portion of said shaft and being spaced from the uppermost portion of said shaft to serve as a carrier for the seeds within said openings; a separate distancing tube between two adjacent units, said distancing tube being firmly connected with the hollow shafts of said two units, and wheels supporting the shafts of the units.

3. Seed-sowing machine having a plurality of sowing units located in one row, each of said units comprising a seed-receiving container, a seed-ejecting hollow shaft communicating with said container and having formed therein rows of seed-ejecting openings, said rows extending perpendicularly to the longitudinal axis of said shaft, the openings in one row being staggered in relation to openings in another row, whereby portions of said shaft located between the openings are of zigzag form, and a cylindrical member of smaller diameter than said shaft and located within said shaft opposite said openings, said cylindrical member lying upon the lowermost portion of said shaft and being spaced from the uppermost portion of said shaft to serve as a carrier for the seeds within said openings; a separate distancing tube between two adjacent units, said distancing tube being firmly connected with the hollow shafts of said two units, two wheels located on opposite sides of said row of units and having flanges firmly connected with the hollow shafts of adjacent units, rods having ends mounted upon said flanges, and a horizontal bar interconnecting opposite ends of said rods and engaging the containers of said units.

References Cited in the file of this patent

UNITED STATES PATENTS

| | | |
|---|---|---|
| 304,368 | Spangler | Sept. 2, 1884 |
| 461,476 | Harrell | Oct. 20, 1891 |
| 478,252 | Cullingworth | July 5, 1892 |
| 637,612 | Hopper | Nov. 21, 1899 |
| 772,329 | Arnold | Oct. 18, 1904 |
| 1,539,333 | Snyder | May 26, 1925 |
| 2,374,132 | Radde et al. | Apr. 17, 1945 |
| 2,428,241 | Pootjes | Sept. 30, 1947 |
| 2,510,658 | Rassmann | June 6, 1950 |
| 2,569,421 | Larson | Sept. 25, 1951 |
| 2,761,589 | Stach | Sept. 4, 1956 |
| 2,771,222 | Orne | Nov. 20, 1956 |